(12) United States Patent
Berry, Jr. et al.

(10) Patent No.: US 9,164,563 B2
(45) Date of Patent: Oct. 20, 2015

(54) PROCESSOR NOISE MITIGATION USING DIFFERENTIAL CRITICAL PATH MONITORING

(75) Inventors: Robert W. Berry, Jr., Round Rock, TX (US); Michael S. Floyd, Cedar Park, TX (US); Jarom Pena, Pflugerville, TX (US); Ryan J. Pennington, Austin, TX (US); Catherine Sherry, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 753 days.

(21) Appl. No.: 13/479,797

(22) Filed: May 24, 2012

(65) Prior Publication Data

US 2013/0318364 A1     Nov. 28, 2013

(51) Int. Cl.
*G06F 1/28*      (2006.01)
*G06F 1/26*      (2006.01)
*G06F 11/30*     (2006.01)

(52) U.S. Cl.
CPC .. *G06F 1/28* (2013.01); *G06F 1/26* (2013.01); *G06F 11/3062* (2013.01)

(58) Field of Classification Search
CPC ..................................... G06F 1/26; G06F 1/28
USPC .......................................................... 702/85
See application file for complete search history.

(56) References Cited

U.S. PATENT DOCUMENTS

| 5,648,723 | A | 7/1997 | Williams |
|---|---|---|---|
| 7,400,555 | B2 | 7/2008 | Franch et al. |
| 7,576,569 | B2 | 8/2009 | Carpenter et al. |
| 7,920,978 | B2 | 4/2011 | Douriet et al. |
| 2007/0013414 | A1 | 1/2007 | Paillet et al. |
| 2007/0192636 | A1* | 8/2007 | Gonzalez et al. ............. 713/300 |
| 2009/0063884 | A1 | 3/2009 | Weekly |
| 2009/0091378 | A1* | 4/2009 | Haridass et al. ............... 327/554 |
| 2009/0309622 | A1 | 12/2009 | Joshi et al. |
| 2012/0043982 | A1 | 2/2012 | Carpenter et al. |
| 2014/0143596 | A1 | 5/2014 | Berry, Jr. et al. |

FOREIGN PATENT DOCUMENTS

| JP | 61-248102 A | 11/1986 |
|---|---|---|
| JP | 04-367945 A | 12/1992 |

OTHER PUBLICATIONS

Franch et al. "On-chip Timing Uncertainty Measurements on IBM Microprocessors," IEEE International Test Conference, 2007. ITC 2007, Oct. 21-26, 2007, pp. 1-7, doi: 10.1109/TEST.2007.4437560.

* cited by examiner

*Primary Examiner* — Toan Le
*Assistant Examiner* — Manuel Rivera Vargas
(74) *Attorney, Agent, or Firm* — Steven L. Bennett; Arnold B. Bangali

(57) ABSTRACT

An approach for power supply noise mitigation on a processor is provided. In one aspect, the approach comprises a central computing unit operatively coupled to the processor to execute program operations. The approach further comprises a calibration circuit adapted to determine a first threshold on the processor to be used for comparison performed dynamically through the use of a detection circuit. A detection circuit adapted to dynamically monitor system operation of the processor and indicate if the first threshold is violated and a counting circuit adapted to prevent voltage from drooping if one or more voltage sensing measurements violates the first threshold are also provided.

5 Claims, 10 Drawing Sheets

PROCESSOR NOISE MITIGATION USING DIFFERENTIAL CRITICAL PATH MONITORING

TECHNICAL FIELD

The present invention relates generally to mitigation of processor power supply noise, and more particularly to processor power supply noise detection using differential critical path monitoring measurements in skitter mode.

BACKGROUND

Integrated circuits such as processors continue to operate at faster clock speeds. Power generated and distributed from a power source to assemblies or subassemblies of circuits operating on a processor can generate power supply noise which can adversely impact system functionality and operation of high-speed processors.

Power supply noise generated from the power source, which is propagated to assemblies and subassemblies of circuits, can cause voltage droops in critical paths of the processor. Voltage droops in critical paths can affect the speed at which the processor operates. Moreover, variations in manufacturing of components that both generate and deliver power from the power source to assemblies and subassemblies of circuits operating on the processor can exacerbate power supply noise effects. These subtle effects are difficult to detect and distinguish from workload variations executed on the processor.

SUMMARY

In one embodiment of the present invention, a method is provided for mitigating power supply noise in a processor, comprising a calibration circuit executing a pre-specified workload on the processor, wherein the pre-specified workload drives substantially the same power supply load to each core of the processor, the calibration circuit determining a first threshold, the first threshold is determined using a correctly functioning power supply to detect inadequate power delivered to the processor, wherein the first threshold is used for a comparison performed dynamically through the use of a detection circuit, the detection circuit dynamically monitoring system operation of the processor and indicating if the first threshold is violated and responsive to the indication, the detection circuit adjusting an operational parameter of the processor to avoid system failure or degradation of performance of the processor.

In another embodiment, an apparatus that mitigates power supply noise in a processor, comprises a central computing unit operatively coupled to the processor, a calibration circuit adapted to determine a first threshold on the processor to be used for comparison performed dynamically through the use of a detection circuit, a detection circuit adapted to dynamically monitor system operation of the processor and indicate if the first threshold is violated and a counting circuit adapted to prevent voltage from drooping if one or more voltage sensing measurements violates the first threshold.

BRIEF DESCRIPTION OF THE SEVERAL VIEWS OF THE DRAWINGS

Novel characteristics of the invention are set forth in the appended claims. The invention itself, however, as well as a preferred mode of use, further objectives, and advantages thereof, will be best understood by reference to the following detailed description of the invention when read in conjunction with the accompanying figures, wherein like reference numerals indicate like components, and:

DETAILED DESCRIPTION

Figure 1:
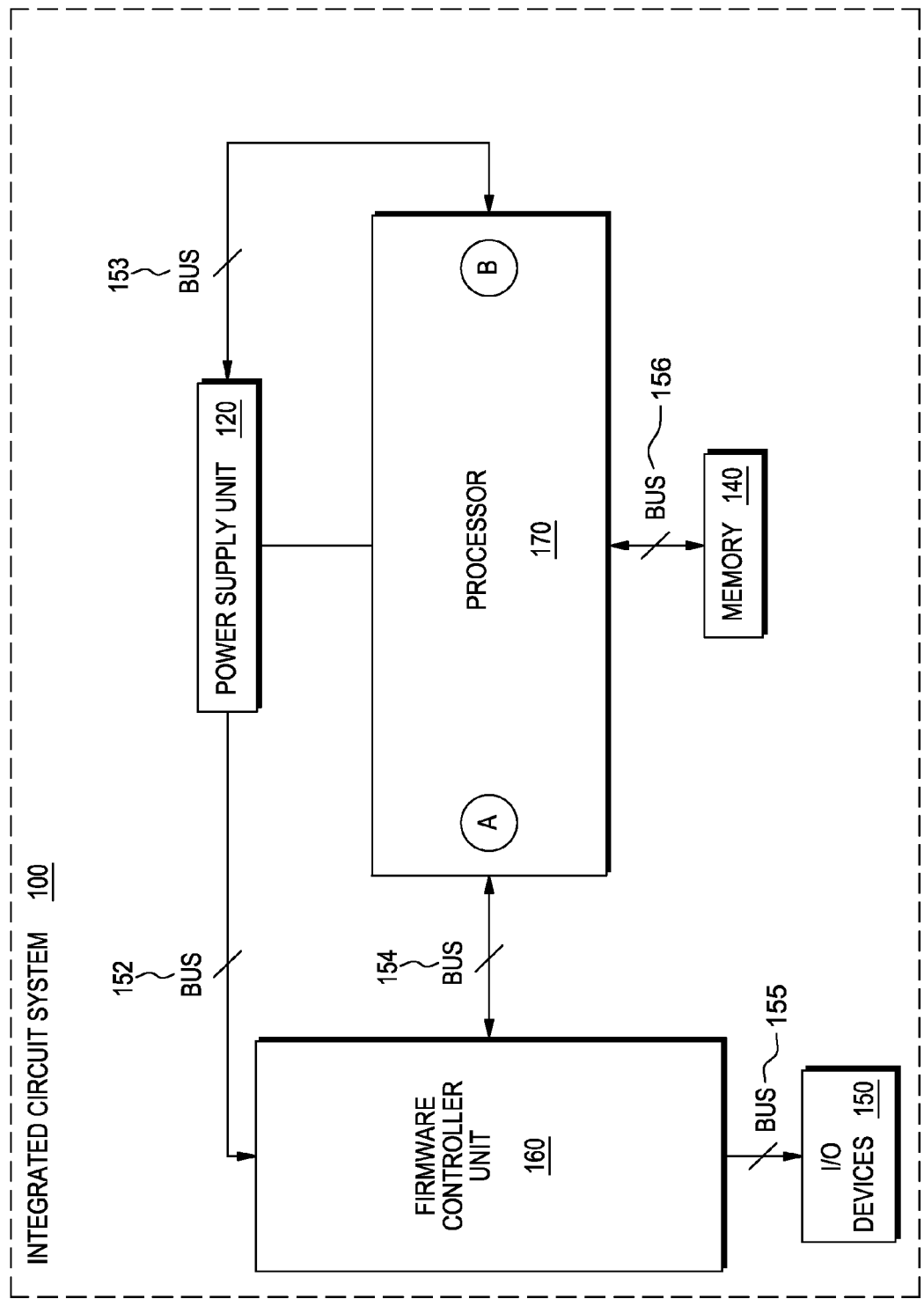
FIG. 1 is depicts a block diagram of an integrated circuit system, according to an embodiment of the present invention.

Embodiments of the present invention comprise functionality for mitigating deleterious effects of power supply noise in the performance of integrated circuits, e.g., processors.

Embodiments of the present invention provide circuits or subassemblies of circuits as well as methods of operation, adapted to perform power supply noise mitigation functions on a processor. In particular, the power supply noise mitigation functions are performed to detect deleterious effects of power supply noise on the processor.

In one aspect of the present invention, power supply noise mitigation functions can be performed by functional circuits or system architectures to detect deleterious effect of power supply noise on the processor in accordance with embodiments of the present invention. In addition, aspects and operations of circuits or subassemblies of circuits that are related in some respects to embodiments of the present invention are described in commonly owned patents: U.S. Pat. Nos. 7,400,555 B2, 7,920,978 B2 and 7,576,569 B2, as well as commonly owned U.S. Pat. Pub. No. US 2012/0043982 A1, all of which are incorporated herein by reference.

The present invention comprises a calibration circuit adapted to perform a noise calibration function on a processor. The calibration circuit may include a monitoring circuit, and in one embodiment, may include a voltage monitor circuit. The monitoring circuit performs the noise calibration function to determine a first threshold on the processor. The first threshold is determined using a correctly functioning power supply to detect inadequate power delivered to the processor. The monitoring circuit further comprises an edge detection circuit adapted to detect the first threshold as one or more voltage droops that occur within the processor.

The present invention further comprises a detection circuit. The detection circuit is adapted to detect noise in the processor. The detection circuit can be a droop threshold detect circuit that detects noise by comparing the first threshold against one or more operational margins monitored during system operation of the processor. In addition, the droop threshold detect circuit is adapted to indicate if the first threshold is violated based on the comparison. Responsive to the indication, the droop threshold detect circuit is further adapted to adjust operational parameters of the processor to avoid system failure and degradation of performance of the processor.

The present invention may also include a counting circuit adapted to perform a noise correction function. In particular, the noise correction function entails a counting circuit. The counting circuit is adapted to prevent voltage on critical paths of the processor from drooping if one or more voltage sensing measurements violate the first threshold. The counting circuit is further adapted to place the processor into a temporary working range and prevent drooping voltage on the processor if the one or more voltage sensing measurements violates the first threshold.

In one aspect, voltage droop within the processor results from a loss in power supply output voltage induced by various factors. A critical path within the processor is typically a signal path that is susceptible to the deleterious effects of power supply noise, including loss in voltage to the processor. Loss in output voltage on the processor can result in timing uncertainty in clock edge frequency during an operation of the processor. In addition, loss in output voltage on the processor can cause timing variations in clock edge arrival times at different registers on the processor in a given clock frequency cycle.

Further aspects of the present invention will now be described in conjunction with the figures. Referring now to FIG. 1, an integrated circuit system 100 for mitigating the effects of power supply noise on performance of integrated circuit system 100, according to an embodiment of the invention is depicted.

Integrated circuit system 100 is a set of circuits and subassemblies which can be susceptible to effects caused by components that generate and deliver power to integrated circuit system 100 and alternatively contribute to power supply noise which impact the performance of integrated circuit system 100. In one embodiment, integrated circuit (IC) system 100 includes power supply unit 120, processor 170, memory 140, I\O devices 150, firmware controller unit 160 and buses 152, 153, 154, 155 and 156. Integrated circuit system 100 can also include other additional elements and functionalities typical of an integrated circuit system which are not shown.

Buses 152, 153, 154, 155 and 156 are subsystems of IC system 100 that operate to transfer data between the system's circuits and subassemblies. Buses 152, 153, 154, 155 and 156 transport sense or control signals propagated through the circuits and subassemblies of integrated circuit system 100. In one aspect, a sense signal can serve to measure existing operational margins and provide the current workload state and environmental conditions of integrated circuit system 100. In general, operational margins in an integrated circuit system i.e., integrated circuit system 100 is affected by manufacturing, process, thermal fluctuation, frequency changes, voltage slewing, and aging. In particular, a control signal can operate to indicate operational margins of integrated circuit system 100, according to embodiments of the present invention.

Power supply unit 120 operates to generate and deliver power to integrated circuit system 100. In one example, processor 170 is an IBM® Power Series® processor (IBM and Power Series are registered trademarks of International Business Machines Corporation in the United States, other countries, or both). Further, processor 170 can be any processor capable of performing various functions through which the present invention can be implemented.

Figure 2:
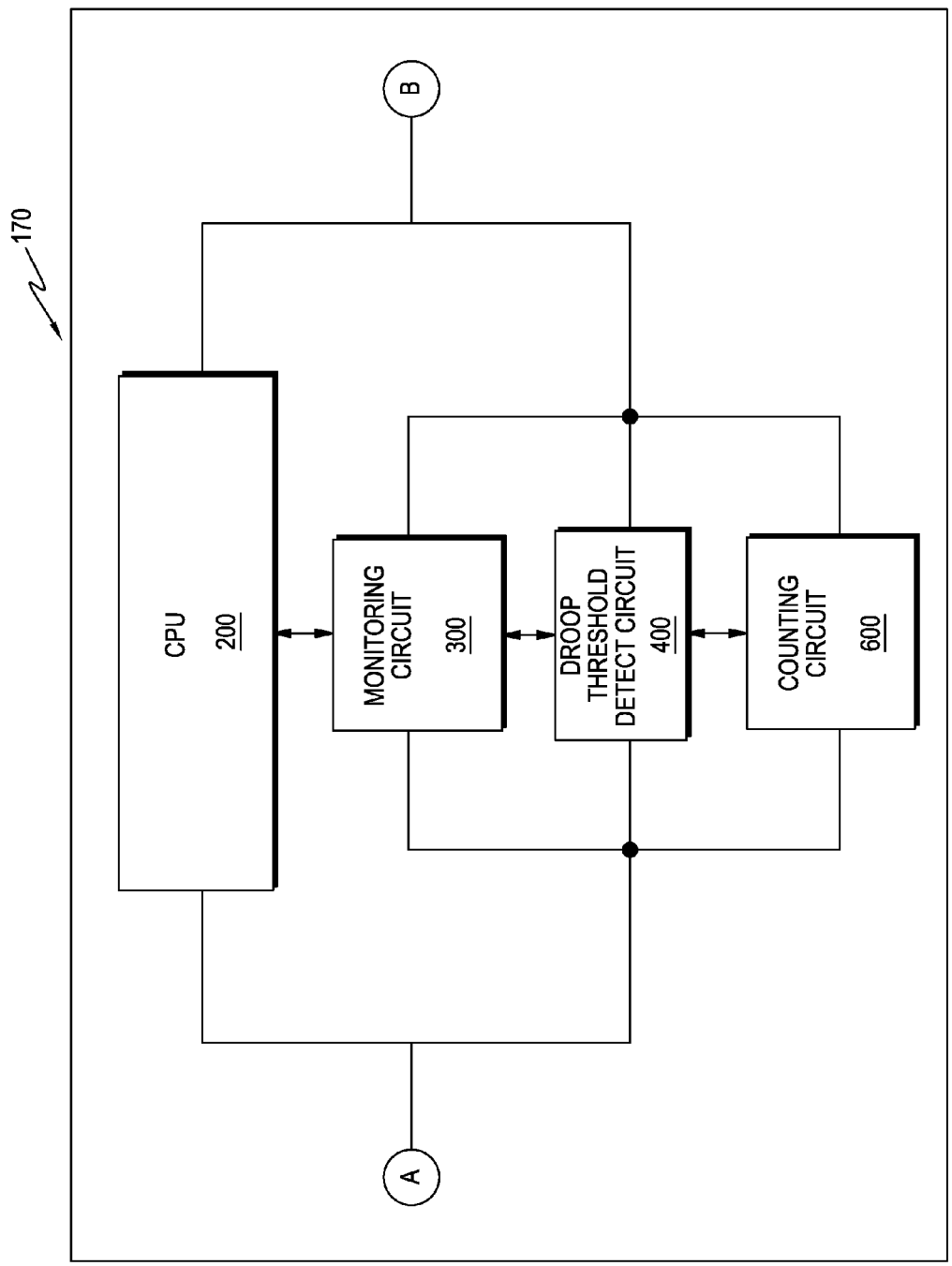
FIG. 2 depicts a schematic diagram of a processor, according to an embodiment of the present invention.

Processor 170 includes connections A and B which operate to provide for the propagation of signals to the various components depicted in FIGS. 1 and 2. In one aspect, power supply unit 120 is connected with firmware controller unit 160 through bus 152 and is connected to processor 170 through bus 153. Memory 140 stores program instructions for performing one or more methods in accordance with embodiments of the present invention. Program instructions stored by memory 140 are executed by processor 170 to monitor effects of power supply noise on the performance of circuits and subassemblies of integrated circuit system 100. I/O devices 150 can include devices to process, propagate or display signals or data received or sent through circuits or subassemblies comprising integrated circuits system 100. In one embodiment, memory 140 is connected to processor 170 through bus 156. Alternatively, I/O devices 150 are connected to firmware controller unit 160 through bus 155.

Firmware controller unit 160 operates to internally control the circuits and subassemblies of integrated circuit system 100. In one example, firmware controller unit 160 dynamically manages reactions to varied operational conditions such as voltage droops, temperature and workload variations found on integrated circuit system 100. Further, firmware controller unit 160 is connected to processor 170 through bus 154.

Referring now to FIG. 2, a schematic diagram illustrating circuits and subassemblies of processor 170, according to an embodiment of the present invention is depicted.

Processor 170 includes Central Processing Unit (CPU) 200, monitoring circuit 300, droop threshold detect circuit 400, and counting circuit 600. CPU 200 is operatively coupled to processor 170. In particular, CPU 200 is further adapted to execute program instructions on processor 170.

In addition, monitoring circuit 130 is adapted to determine a first threshold on processor 170. Droop threshold detect circuit 400 is adapted to compare the first threshold against one or more operational margins monitored during system operation on processor 170. Droop threshold detect circuit 400 is further adapted to indicate if the first threshold is violated based on the comparison. Responsive to the indication, droop threshold detect circuit is further adapted to adjust an operational parameter of processor 170 to avoid system failure and degradation of performance of processor 170. Counting circuit 600 is adapted to place processor 170 into a temporary working range and clear drooping voltage on processor 170 if one or more voltage sensing measurements violate the first threshold.

Figure 3A:
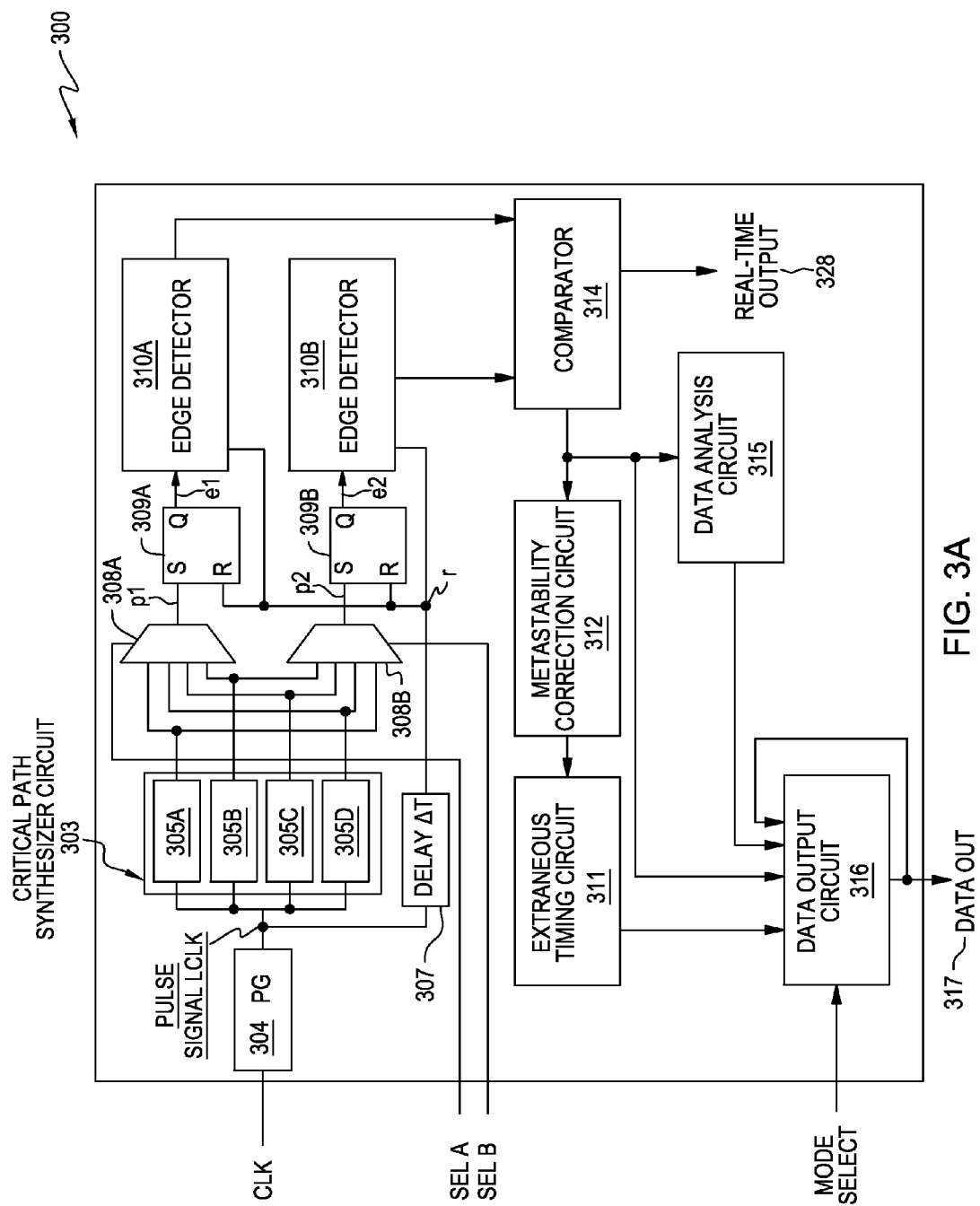
FIGS. 3A-3C depict schematic diagrams of a monitoring circuit, according to an embodiment of the present invention.
Figure 3B:
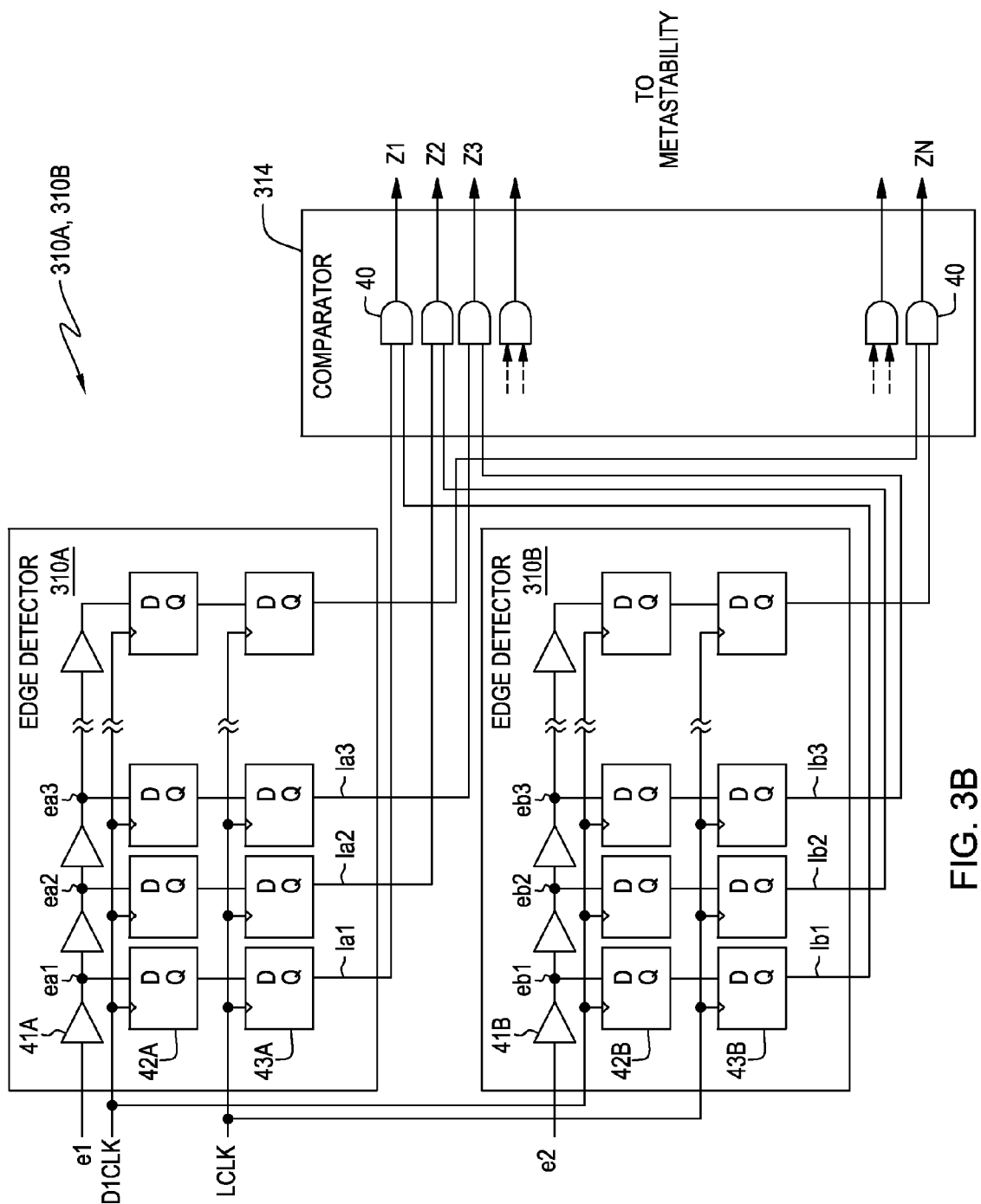
Figure 3C:
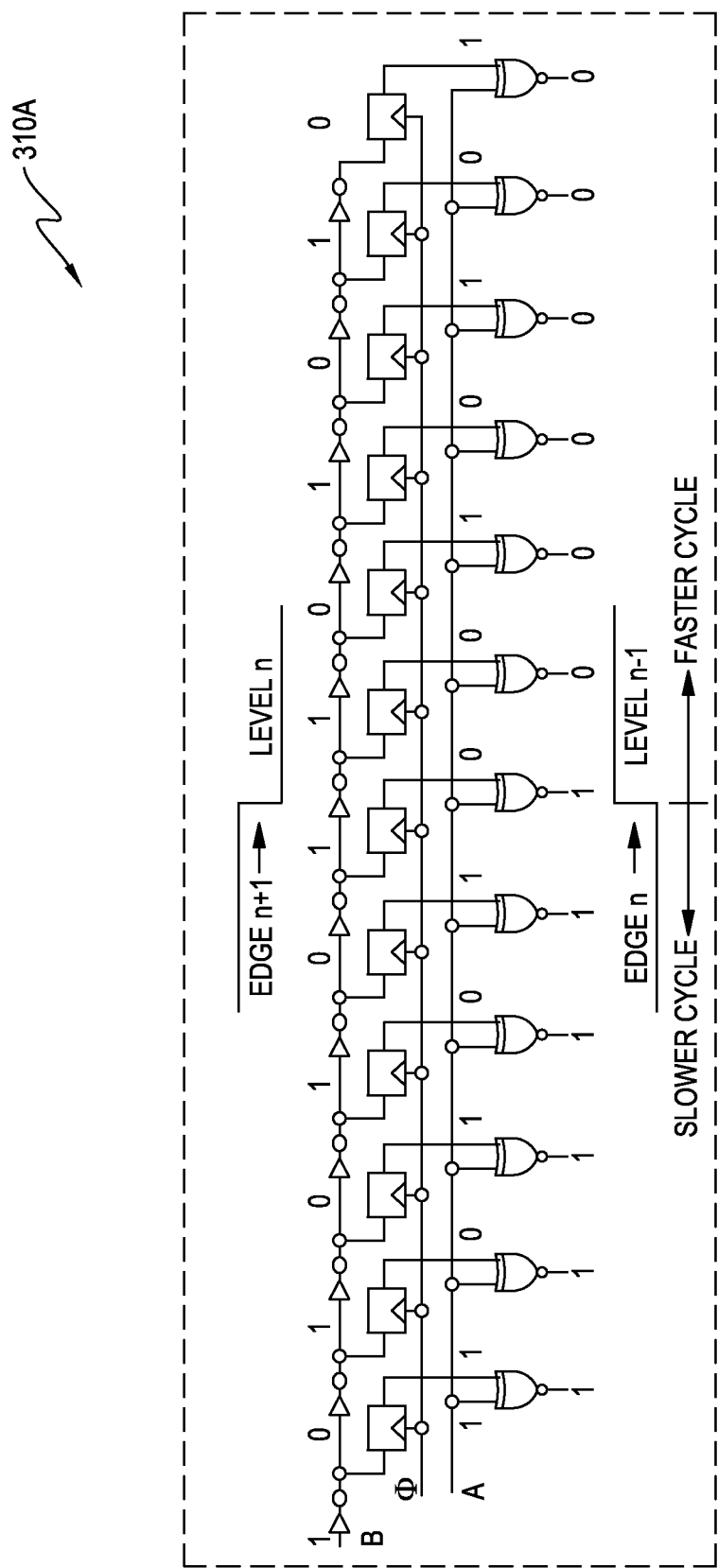

Referring now to FIGS. 3A-3C, an illustration of monitoring circuit 300 in which power supply noise mitigation functions can be implemented, according to an embodiment of the present invention is depicted.

Referring now to FIG. 3A, a schematic diagram is shown illustrating a block diagram of monitoring circuit 300.

Monitoring circuit 300 is adapted to perform a noise calibration function on processor 170. The noise calibration function is adapted to provide real time feedback of variations in clock frequency fluctuations with dynamic changes in the number of voltage droops present on critical paths of processor 170. In particular, the noise calibration function is performed by the monitoring circuit 400 to determine a first threshold on the processor to be used for comparison performed dynamically through the use of a detection circuit. The first threshold is determined using a correctly functioning power supply to detect inadequate power delivered to the processor, as described below.

Monitoring circuit 300 is adapted to execute a pre-specified workload on processor 170. The pre-specified workload is adapted to drives substantially the same power supply load to each core of processor 170. In particular, the pre-specified workload is executed on processor 170 at a substantially constant clock frequency and substantially the same voltage until a temperature of processor 170 is substantially stabilized.

In one aspect, processor 170 can operate at a temperature range between 60° C.-90° C. Further, during execution of the pre-specified workload, constant clock frequency of processor 170 can be maintained at a range of 53 MHz-66 MHz. In addition, the voltage applied on processor 170 can be maintained at a range of 2.5-3 volts (V). Specifically, monitoring circuit 300 is adapted to determine a first threshold based on the executed pre-specified workload.

Monitoring circuit 300 includes an edge detection circuit. The edge detection circuit is adapted to detect and record, during a pre-determined time period, a number of voltage droops that occur on processor 170 as a first threshold. In particular, the monitoring circuit determines a range of jitter that occurs on processor 170 by detecting and recording, during the pre-determined time period, one or more voltage droops that occur within processor 170 as the first threshold.

In addition, the first threshold is determined using a correctly functioning power supply to detect inadequate power delivered to processor 170. Further, monitoring circuit 300 is adapted to determine multiple thresholds to support multiple corresponding operating clock frequencies during system operation of processor 170. The first threshold can be a calibrated threshold which is detected and recorded on processor 170 (shown in FIG. 1) for comparison against one or more operational margins monitored during system operation of processor 170. Further, monitoring circuit 300 is adapted to detect an amount of voltage droops on critical paths of processor 170 in the form of timing variations in clock edge frequency fluctuations or noise jitter that can be present in a cycle to cycle frequency on the critical paths during an operation of processor 170.

In this manner, voltage droops present during an operation of processor 170, can cause timing uncertainty within processor 170. In one example, timing variations can include, clock frequency fluctuations or noise jitter. In a processor core for instance, the maximum frequency of the processor clock is dictated by timing variations of critical paths within processor 170, i.e., a path that, at a given operating temperature and voltage, will cause the processor to fail when the frequency of the processor clock is raised about a particular clock frequency. In particular, noise jitter, i.e., voltage droops can be considered the primary source of timing uncertainty during an operation of processor 170. In this manner, timing uncertainty can particularly result in varied fluctuations in clock edge arrival times to different registers on processor 170 in a given clock frequency cycle.

In short, a pulse signal is propagated through the one or more critical paths used to synthesize noise jitter indicative of a timing uncertainty to a pair of edge detectors. In another aspect, the output of the edge detectors is compared, yielding a result indicative of the longest critical path from among the one or more critical paths in which noise jitter or voltage droops are present during an operation of the processor.

In the depicted example, pulse generator circuit 304 is adapted to generate a pulse signal lclk in response to a timing edge of clock signal CLK. Further, delay 307 is adapted to delay reset pulse signal r so that the reset of latches 309A-309B occur after latest possible falling edges of pulse signals p1 and p2. In particular, pulse signal lclk is adapted to propagate through critical path synthesizer circuit 303. Critical path synthesizer circuit 303 includes critical path detectors 305A-305D. In one aspect, critical path detectors 305A-305D are used to synthesize a critical path indicative of a timing variation i.e., noise jitter or voltage droops present during of processor 170.

In addition, critical path detectors 305A-305D can include, but need not be limited to, chains of inverters, wire paths, logic gates, and SRAM read paths. In one example, multiplexers 308A-308B select either the output of a single critical path detectors 305A-305D or a combination of two separate critical path detectors 305A-305D, according to selection values Sel A and Sel B. In one embodiment, when pulse signals p1 and p2 arrive at latches 309A-309B, respectively, rising transitions in output e1-e2 of latches 309A-309B are provided to inputs of corresponding egde detectors 310A-310B, respectively. In addition, comparator 314 performs a logical-AND operation on the outputs of edge detectors 310A-310B, which in turn, generates an output result indicative of the edge position of the last pulse edge to arrive. In one aspect, the output of comparator 314 is provided to metastability correction circuit 312 and data output circuit 316.

The combination of edge detectors 310A-310B and comparator 314 generates an indication of the arrival of either a timing Clk edge frequency of the pulse propagated through the longest of two different critical paths or an edge of the pulse signal lclk propagated through a single critical path, according to whether selection values Sel A and Sel B select different critical paths or the same critical paths. In one aspect, the output of comparator 314 is also provided as a real time indication to track changes in critical paths of processor 170. Real time output 328 can be encoded to reduce the number of bits required to represent a variation of timing clock edges in critical paths of processor 170.

Metastability correction circuit 312 is further adapted to eliminate errors caused by metastable states occurring within edge detectors 310A-310B. In particular, in when processor 170 is in a metastable state, monitoring circuit 300 may be unable to settle into a stable '0' or '1' logic within the time required for proper operation of processor 170. Consequently, processor 170 performs an operation in unpredictably during a metastable state which may ultimately result in system failure of processor 170 in accordance with embodiments of the present invention.

In one aspect, when metastable conditions occur, because the values of the outputs of edge detectors 310A-310B are not necessarily resolved to the correct determined logical states, extraneous reversals in the edge position may result at the output of metastability correction circuit 312. In another aspect, the output of the metastabilty correction circuit 312 is provided to an extraneous timing circuit 311. Extraneous timing circuit 311 is adapted to remove any extraneous timing clock frequency edge reversals in critical path measurements results of processor 170.

Data analysis circuit 315 is adapted to perform statistical calculations on an output of comparator 314 to provide data which can reflect, but need not be limited to, a minimum, maximum, or moving average of the output of comparator 314. Data output circuit 316 is adapted to accept an output of comparator 314, extraneous timing circuit 311, data analysis circuit 315 and a feedback value from an output of data output circuit 316. In one aspect, data output circuit 316 can be a logic circuit that provides selectable timing clock edge frequency measurement results to data out 317. In one aspect, the results of data out 317 are measured according to an operation mode selected by a mode selection value Mode Select.

Referring now to FIG. 3B, a detailed illustration of edge detector 310A-310B of FIG. 3A is shown, in accordance with an embodiment of a present invention is depicted. In the depicted embodiment, signal e1, which is the output of latch 309A of FIG. 3A is provided to a delay line formed by a cascade of buffers 41A, which provides inputs to a plurality of transparent latches 42A forming a latch bank. Signals ea1-ea3 are delayed versions of signal e1 at the outputs of the first three buffers 41A, which are progressively delayed by an additional buffer delay.

In one embodiment, the delay of the pulse signal lclk generated by pulse generator 304 is propagated through selected ones of critical path detectors 305A-305D, multiplexer 308A, and latch 309A, such that edge detector 310A is in a proper operating range. In addition, a transition will be captured in one of the latches 43A when lclk is asserted and output as signals 1a1-1a3. Further, signal e2, which is the output of latch 309B of FIG. 3A is provided to a delay line formed by a cascade of buffers 41B, which provides inputs to a plurality of transparent latches 42B forming latch bank.

Signals ea1-ea3 are delayed versions of signal e1 at the outputs of the first three buffers 41A, which are progressively delayed by an additional buffer delay. In another aspect, signals eb1-eb3 are delayed versions of signal e2 at the outputs of the first three buffers 41B, which are progressively delayed by an additional buffer delay. In another embodiment, in reference to edge detector 310A, the delay of pulse signal lclk generated by pulse generator 304 through the selected one of the critical path detectors 305A-305D, multiplexer 308B, and latch 309B, such that edge detector 310A is in a proper operating range. In addition, a transition will be captured in one of the latches 43A when lclk is asserted and outputs signals 1b1-1b3.

In addition, signal e2, which is the output of latch 309B of FIG. 3A, is provided to a delay line formed by a cascade of buffers 41B, which provides inputs to a plurality of transparent latches 42B forming a latch bank. Signals ea1-ea3 are delayed versions of signal e2 at the outputs of the first three of buffers 41B, which are progressively delayed by an additional buffer delay.

Further, in reference to edge detector 310B, the delay of pulse signal lclk through the selected one of critical path detectors 305A-305D, multiplexer 308A, and latch 309B of FIG. 3A is such that edge detector 310B is in a proper operating range. Further, a transition will be captured in one of the latches 43B when lclk is asserted and output as signals 1b1-1b3.

Comparator 314 which is formed of a plurality of logical AND gates 40, receives outputs 1a1-1a3 and 1b1-1b3 of latches 43A-43B, respectively, and provides a logic high result at bit positions only where the corresponding bit positions of the output of latches 43A and 43B are both logic high, yielding a result z1-zN indicative of the arrival timing edge clock edge frequency variation of the longest synthesized critical path of processor 170.

Referring now to FIG. 3C, a schematic diagram of edge detector 310A of FIG. 3A, in accordance with an embodiment of the present invention is depicted.

In one embodiment, edge detector 310A includes a plurality of buffers, latches, and XOR gates configured as shown. In addition, edge detector 310A receives an edge (rising or falling) from one or more of the timing clock edge paths. As depicted, the rising edge is provided to the latches as it is passed through the inverters, and the falling edge is provided directly to NOR or XOR gate as the case may be. Further, a synchronization signal is received by the latches, as a previously stored falling edge to corresponding XOR and XNOR gate.

The XOR and XNOR gates are adapted to compare the previously stored falling edge and currently received rising edge to produce a binary output from the XOR and XNOR gates that is representative of the timing edge clock frequency associated with the monitored critical path (i.e., as the falling edge travels through the chain of inverters it will not necessarily be received by all of the inverters). In one another embodiment, the position of the high to low transition in the output from the XOR and XNOR gates indicates the timing edge clock frequency with respect to noise jitter i.e., voltage droops detected and recorded on processor 170.

Figure 4A:
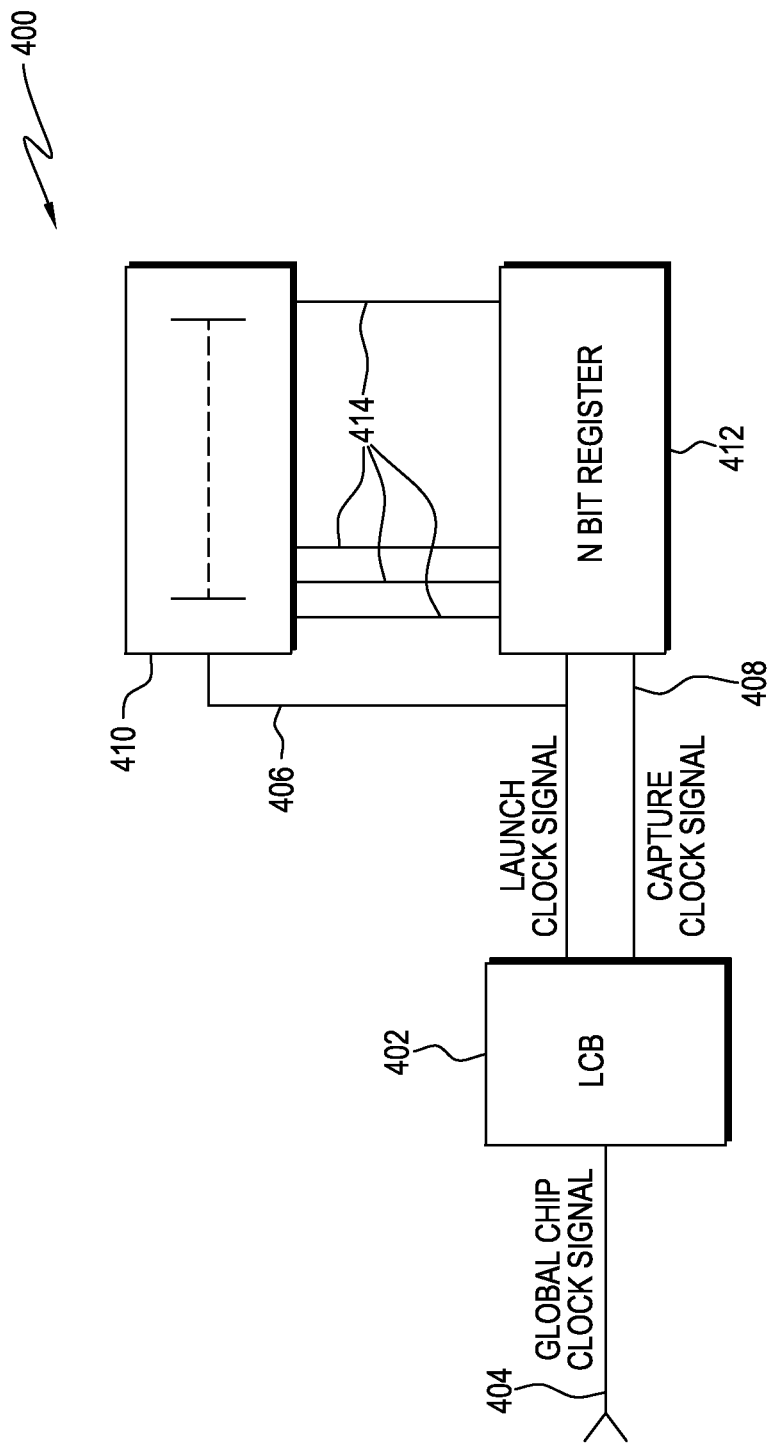
FIGS. 4A and 4B depict schematic diagrams of a droop threshold detect circuit, according to an embodiment of the present invention.
Figure 4B:
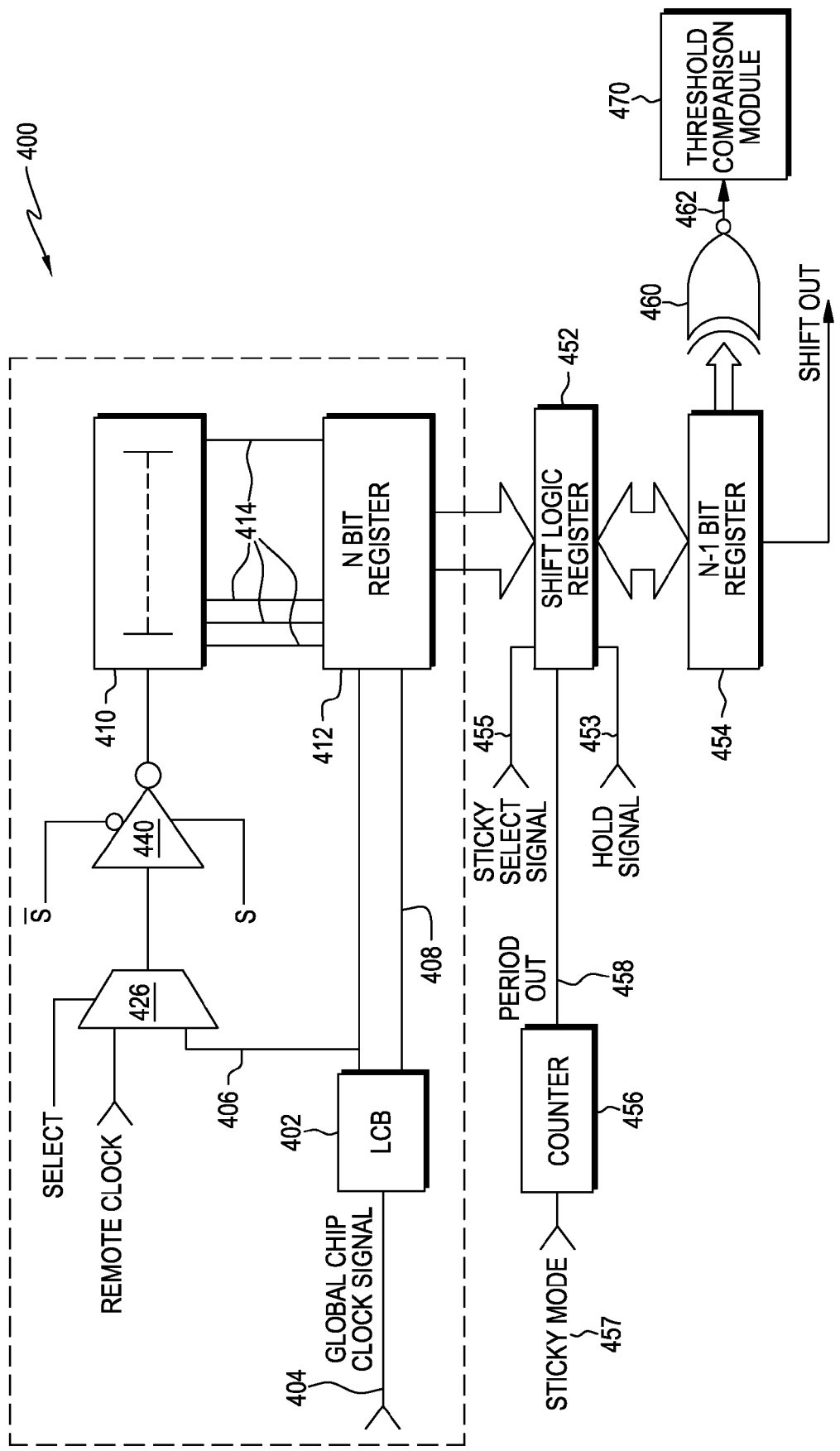

Referring now to FIGS. 4A and 4B, an illustration of perspective views of droop threshold detect circuit 400, in accordance with an illustrative embodiment of the present invention is depicted.

Referring now to FIG. 4A, a schematic diagram is shown illustrating droop threshold detect circuit 400, according to an embodiment of the present invention is depicted.

Droop threshold detect circuit 400 operates to perform a noise detection function on processor 170. Droop threshold detect circuit 400 further operates to compare the first threshold against one or more operational margins monitored during system operation of the processor determine in the noise calibration function by monitoring circuit 300, as described above. Further, if the one or more operational margins violates the first threshold, droop threshold detect circuit 400 is adapted to perform an instruction interrupt which places processor 170 into a degraded performance mode.

In one aspect, droop threshold detect circuit 400 operates to indicate if the first threshold is violated based on the comparison. Responsive to the indication, the detection circuit 400 is further adapted to adjust an operational parameter of processor 170 to avoid system failure or degradation of performance of processor 170. In addition, droop threshold detect circuit 400 is further adapted to adjust operational parameters of multiple operating modes on processor 170 and also adjust voltage s, changing clock frequencies or throttling instruction rates on processor 170, if the first threshold is violated.

Droop threshold detect circuit 400 includes a delay line of inverters that are inputs to a register that is clocked by a complementary pair of inverters to capture progression of a launch clock through the delay line and identify any timing variations including noise jitter, i.e., voltage droops in that progression within processor 170. In addition, a pulse signal is monitored on processor 170 by droop threshold detect circuit 400 for timing uncertainty. Further, the pulse signal is captured each clock frequency cycle in a set of delay line inverters operating in droop threshold detect circuit 400.

In one example, edge detect latches have a bit comprising a value of "1" (or alternatively "0") that fill the latches depending on how far the edge detect penetrates into a combination of delay line inverters of detection circuit 400. In another example, a 16 bit element is captured by edge detect latches through droop threshold detect circuit 400. In this case, a transition from a "1" to a "0" travelling through the latches comprises 00000000[11111111] i.e., an 8 bit edge detect count is the threshold.

In another example, voltage droop will cause the delay elements to slow down in penetration making zeros penetrate less into the edge detect latches of droop threshold detect circuit 400. Therefore, any additional voltage droop would cause an additional edge detect through a delay line of inverters on droop threshold detect circuit 400 because an additional voltage droop "1" bit would result in one additional voltage droop which would be higher than the threshold at 8 bits. In this manner, droop threshold detect circuit 400 is adapted to identify poor clock source (i.e., drooping voltage) on processor 170 as shown in FIG. 1, in which significant noise jitter can be the cause of a timing uncertainty on processor 170 due to the poor clock source.

In the illustrated embodiment, local clock block (LCB) 402 is adapted to receive a global chip clock signal 404 into two completed local clock signals, e.g., launch clock signal 406 and capture clock signal 408. In one aspect, launch clock signal 406 is provided to delay line 410. In addition, delay line 410 is further adapted to mimic data propagation delay through an actual data path on processor 170. Further, both launch clock signal 406 and capture clock signal 408 are adapted to propagate signals into clock capture register (N bit register) 412. In one example, N=129 can be a convenient length for holding 3 cycles worth of timing edge detect signals.

In one aspect, capture clock signal 408 is adapted to capture a forward position of the timing edges in the N bit register 412. In one example, the rising edge of launch clock signal 406 and the falling edge of capture clock signal 408 are derived from the same global chip clock signal 404. Further, the rising edge of launch clock signal 406 and the falling edge of the capture clock signal 408 (which latches the data through processor 170) are derived from the same global clock 405 edge. In an alternative embodiment, LCB 402 and delay line 410 mimic data propagation delay through an actual data path on processor 170. In another aspect, both launch clock signal 406 and capture clock signal 408 are further adapted to clock N bit register 412. Delay line taps 414 are stage inputs to N bit register 412.

In another aspect, launch clock signal 406 drives delay line 410 and, preferably, the delay difference between each pair of taps 414 is equivalent to one logic block delay. In one aspect, total timing uncertainty metric is the number of combinational logic stages that complete in a cycle, sometimes referred to as the fan-out of 4 (FO4) inverter count. Alternatively, for the best time resolution, the delay between delay line taps 414 is the minimum delay for the particular technology, e.g., the delay for a single fan-out inverter (FO1 inverter). In one embodiment, delay line 410 is at least three clock periods long, i.e., long enough that the start of one clock cycle, the leading clock edge, has not propagated through delay line 410 before the start of the second subsequent cycle enters delay line 410. Therefore, delay line 410 normally has 3 edges passing through it. In addition, N bit register 412 is clocked by both launch clock signal 406 and capture clock signal 408.

In addition, at the start of a global chip clock signal 404, launch clock signal 406 passes a previously loaded N bits out of register 412 as the leading edge begins traversing delay line 410. Alternatively, at the end of each global chip clock signal 404, capture clock signal 408 latches the state of the delay line taps 414 in the N bit register 412, capturing the progress of launch clock signal 406 edges through delay line 410. In one embodiment, in the absence of noise jitter or other sources of timing uncertainty, the location of the edge (tap number) does not change from cycle to cycle.

In one example, delay line 410 can be a series of inverters with delay line taps 414 being inverter outputs. In this manner, taps 414 alternate "1"s and "0"s and the clock signal edges are located by a matched pair (either 2 "0"s in a row, or 2 "1"s in a row) of adjacent delay line taps 414. In addition, the space between matching tap pairs, e.g., 60 inverter stages between leading/rising clock edges, is a measure of logic propagation during a complete clock cycle. Therefore, the same LCB 402 both launches and captures the timing edges and, because LCB 402 itself contains launched data, the clock takes a snapshot of itself in the capturing latches.

Further, the captured edges are evenly spaced in the absence of timing uncertainty either in the clock path or data path. However, timing uncertainty and in particular noise jitter present on processor 170 for instance, is exhibited in a variation in the tap number where the edges get captured. In another example, a first edge (e.g., a leading or rising edge) is always captured in bit position 0 (register latch 0) and in absence of jitter, the second (leading) edge is in bit 60, and the third edge in bit position 120. In one aspect, without jitter, the edges always fall in the same bit positions. However, with occasional short cycle the second edge (for the shorter cycle) shifts by one bit 59; the third edge is captured in bit 119. In another aspect, with 2 consecutive short cycles, however the second edge still shifts to bit 59, the third edge is captured in bit 119. In this manner, with 2 consecutive short cycles however, the second edge still shifts to bit 59, but the third edge shifts to bit 118. For multi-cycle critical paths, such as in processor 170, this underscores the advantage of capturing several cycles in the latched-tapped delay chain so that relationships between consecutive cycles can be identified.

Referring now to FIG. 4B, a schematic diagram illustrating an alternative embodiment of detection circuit 400 of FIG. 4A, including delay inverter 140, according to an embodiment of the present invention is depicted.

In one embodiment, shift logic register 452 selectively passes the contents of N bit register 412 to sticky register (N−1 bit register) 454. Further, shift logic register 452 receives, and in operates in conjunction with hold signal 453 and/or sticky select signal 455 to indicate hold_mode or sticky_mode. In this manner, shift logic register 452 is adapted to pass contents contained therein to N bit register 412 with a combination of hold signal 453 and/or sticky select signal 455. In one aspect, counter 456 is adapted to count during a selected period and at the end of the period, period output 458, i.e., Sticky_mode line of counter 456 initiates sticky mode 457 in shift logic register 452, accumulating captured edge locations. Further, contents of N−1 bit register 454 are provided to error detect logic 460 which is adapted to identify shifting timing edges, for example, and provides an error indication upon detection of an error.

In one aspect, when counter 456 receives a request for sticky mode, counter 456 delays until a selected count completes, i.e., counting down to delay data logging until after certain start up transients have subsided. In another example, a binary delay cycle number may be scanned into counter 456, and counter 456 may then count down to zero that delay cycle number. In addition, once the count down is complete, a signal from counter 456 is transmitted on period output 458 to initiate sticky mode and data logging begins.

Mux 426 operates to selectively pass launch clock signal 406 to local delay line 410 as described in FIG. 4A. In another aspect, selectable delay inverter 440 is adapted to provide a fine delay adjust in the delay line path for better than single inverter timer resolution, e.g., a 3 picoseconds (ps) increments, to more precisely locate where in N−1 bit register 454, i.e., the register latch location the captured edges fall. In one example, if inverter delay 440 provides 20 ps, captured edges may be located anywhere within that 20 ps interval.

Further, by adding fine delays in 3 ps increments, i.e., by deselecting parallel inverters of delay inverter 440 until an edge is captured in the next capture latch, accurately locates the edge within the 20 ps window. With each measurement, error detect logic compares the edge bit locations in sticky register 452 with a programmable mask, i.e., a software component not shown that operates to FIG. 4B with error detect logic 460 and which is a bit set that pre-define valid edge locations or valid edge ranges on processor 170.

Further, an edge falling outside of the valid edge range or zone is an error. Further, upon occurrence of an error, the error output signal 462 is adapted to provide data to threshold comparison module 470. Threshold comparison module 470 is adapted to output comparison of one or more thresholds against one or more operational margins detected and recorded on processor 170 as described above.

Figure 5:
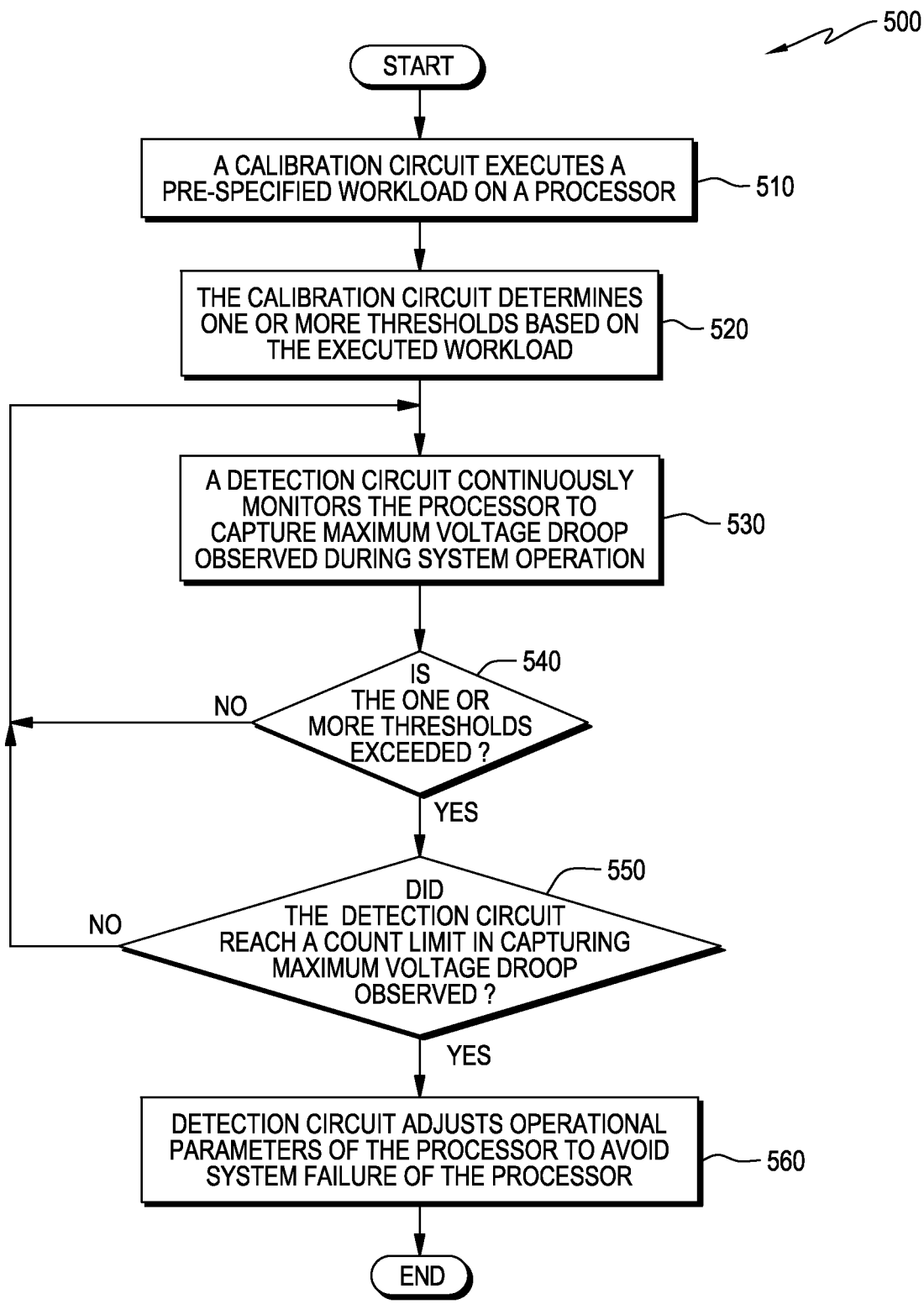
FIG. 5 is a flow diagram of a method for performing power supply noise mitigation functions on a processor, according to an embodiment of the present invention.

Referring now to FIG. 5, a flow diagram 500 for performing power supply noise mitigation functions on processor 170 (shown in FIG. 1) is depicted.

The method shown in flow diagram 500 can be performed by circuits or subassemblies of circuits which are adapted to perform one or more power supply noise mitigation functions on processor 170 in accordance with embodiment of the present invention. In particular, the depicted method can be performed by any functional circuits or system architectures that are adapted to perform the one or more power supply noise mitigation functions on processor 170 in accordance with embodiments of the present invention. In addition, the depicted method is uniquely coordinated to power supply unit 120 of processor 170. In this manner, method 500 can allow monitoring of power supply noise on processor 170 without inducing system failure of processor 170.

The depicted method starts at step 510. At step 510, a calibration circuit executes a pre-specified workload on processor 170. The pre-specified workload drives substantially the same power supply load to each core of processor 170. In particular, the calibration circuit operates to perform a noise calibration function on processor 170. In one aspect, the calibration circuit can be monitoring circuit 300 (shown in FIGS. 3A-3B). The calibration circuit can also be a voltage monitor circuit.

At step 520, the calibration circuit determines one or more thresholds based on the executed pre-specified workload. The calibration circuit further comprises an edge detection circuit. The edge detection circuit operates to detect and record, during a pre-determined time period, one or more voltage droops that occur within processor 170 as a first threshold. In particular, the calibration circuit determines a range of jitter that occurs on processor 170 by detecting and recording, during a pre-determined time period, one or more voltage droops that occur within processor 170 as the first threshold to be used for comparison performed dynamically through the use of a detection circuit.

At step 530, the detection circuit continuously monitors processor 170 to capture maximum voltage droop observed during system operation of processor 170. The detection circuit can be droop threshold detect circuit 400 (shown in FIGS. 4A and 4B). The detection circuit is further adapted to perform a noise detection function on processor 170. The noise detection function is performed by the detection circuit to dynamically monitor one or more operational margins during system operation of processor 170.

At decision 540, detection circuit operates to compare the one or more threshold against the one or more operational margins monitored during system operation of processor 170. If the one or more thresholds is not violated based on the comparison, at step 530, detection circuit operates to continuously monitor the processor to capture maximum voltage droop observed during system operation of processor 170.

In addition, if the one or more threshold is violated based on the comparison, at decision 550, detection circuit operates to determine if a count limit is reached in capturing maximum voltage droop observed during the system operation of processor 170. If the detection circuit does not reach a count limit in capturing maximum voltage droop observed during system operation, at step 530 detection circuit operates to continuously monitor processor 170 to capture maximum voltage droop observed during system operation of processor 170. Alternatively, if detection circuit reaches a count limit in capturing maximum voltage droop observed during system operation of processor 170, at step 560, detection circuit operates to adjust an operational parameter of processor 170 to avoid system failure or degradation of performance of processor 170.

Figure 6:
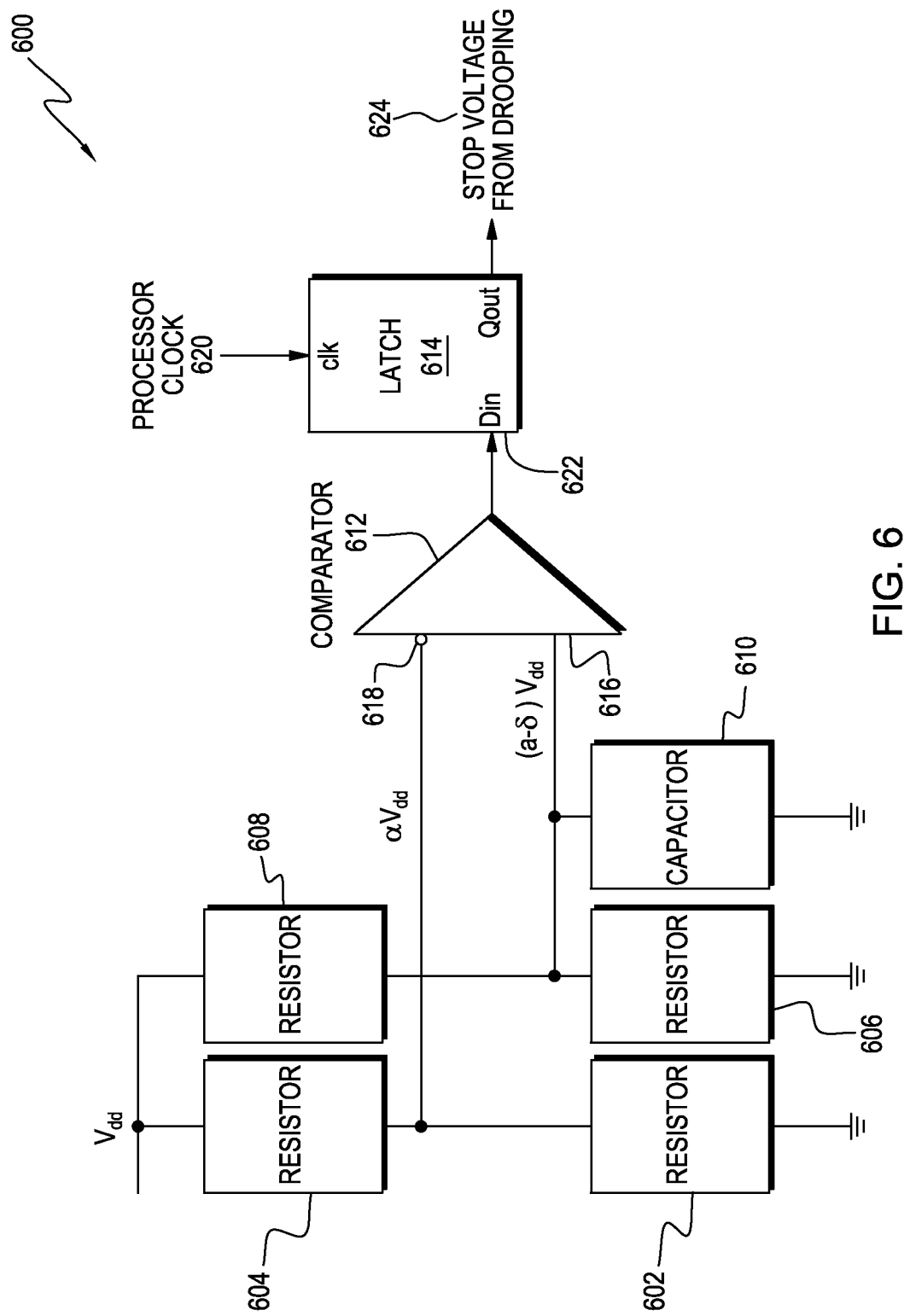
FIG. 6 depicts a schematic diagram of a voltage sensing circuit, according to an embodiment of the present invention.

Referring now to FIG. 6, a schematic diagram of counting circuit 600 in accordance with an embodiment of the present invention is shown.

Counting circuit 600 is adapted to perform a noise correction function on processor 170 (shown in FIG. 1). The noise correction function is adapted to prevent voltage from drooping below a pre-determined voltage sensing threshold point on processor 170 in accordance with an embodiment of the present invention. In particular, the noise correction function is executed by counting circuit 600 on processor 170 to prevent power supply noise from affecting the performance and system functionality of processor 170 by temporarily adjusting voltage droops and throttling instruction execution set, thus forcing processor 170 into a temporary working range.

Counting circuit 600 includes resistors 602, 604, 606, and 608, capacitor 610, comparator 612, and latch 614. Comparator 612 operates to compare two voltages or currents on counting circuit 600 and switches its output to indicate which is larger. In addition, resistors 602 and 604 comprise a resistor divider network that presents a first fraction of the Vdd voltage to inverting input 618 of comparator 612. In one or more embodiments, this first fraction is represented by $\alpha$, a value between 0 and 1. Further, $\alpha$ is chosen to assure that the voltage presented to the inverting input of comparator 612 is within the operational range of comparator 612.

Resistors 606 and 608 comprise a second resistor divider network that presents a second fraction for the Vdd voltage to non-inverting input 616 of comparator 612. This voltage is filtered by capacitor 610 so that the voltage at non-inverting input 616 of comparator 612 is averaged over the time period determined by the values of resistors 606 and 608 and capacitor 610. In one embodiment, the second fraction is slightly less than the first fraction. The second fraction is represented by the term $(\alpha-\delta)$. In one aspect, $\delta$ divided by $\alpha$ represents the fraction of voltage droops below a first threshold point on processor 170. In particular, the first threshold point is measured by monitoring circuit 300 as described in FIGS. 3A-3C.

Latch 614 comprises Din 622, where the comparator inputs to the latch, and Qout 624, which digitally signifies power supply voltage, has dipped/dropped to below the first threshold point of processor clock 620. In addition, the unfiltered Vdd containing noise, $\alpha$Vdd, is compared to the filtered Vdd, $(\alpha-\delta)$Vdd, then comparator 612. If $\alpha$Vdd is lower than $(\alpha-\delta)$ Vdd, then comparator 612 sends a signal to latch 614, and latch 614 sends the message to other circuits on processor 170 to initiate actions to keep the voltage from drooping below the first threshold point.

In one aspect, since counting circuit 600 identifies voltage droops that are detected during a clock frequency time cycle, counting circuit 600 can function as the voltage operating point varies with time. Further, latch 614 sends a signal to other circuits operating on processor 170 to initiate actions to keep the voltage from drooping below the first threshold point a voltage sensing value is lower than the first threshold point. Further, modifications and variations of counting circuit 600 will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Figure 7:
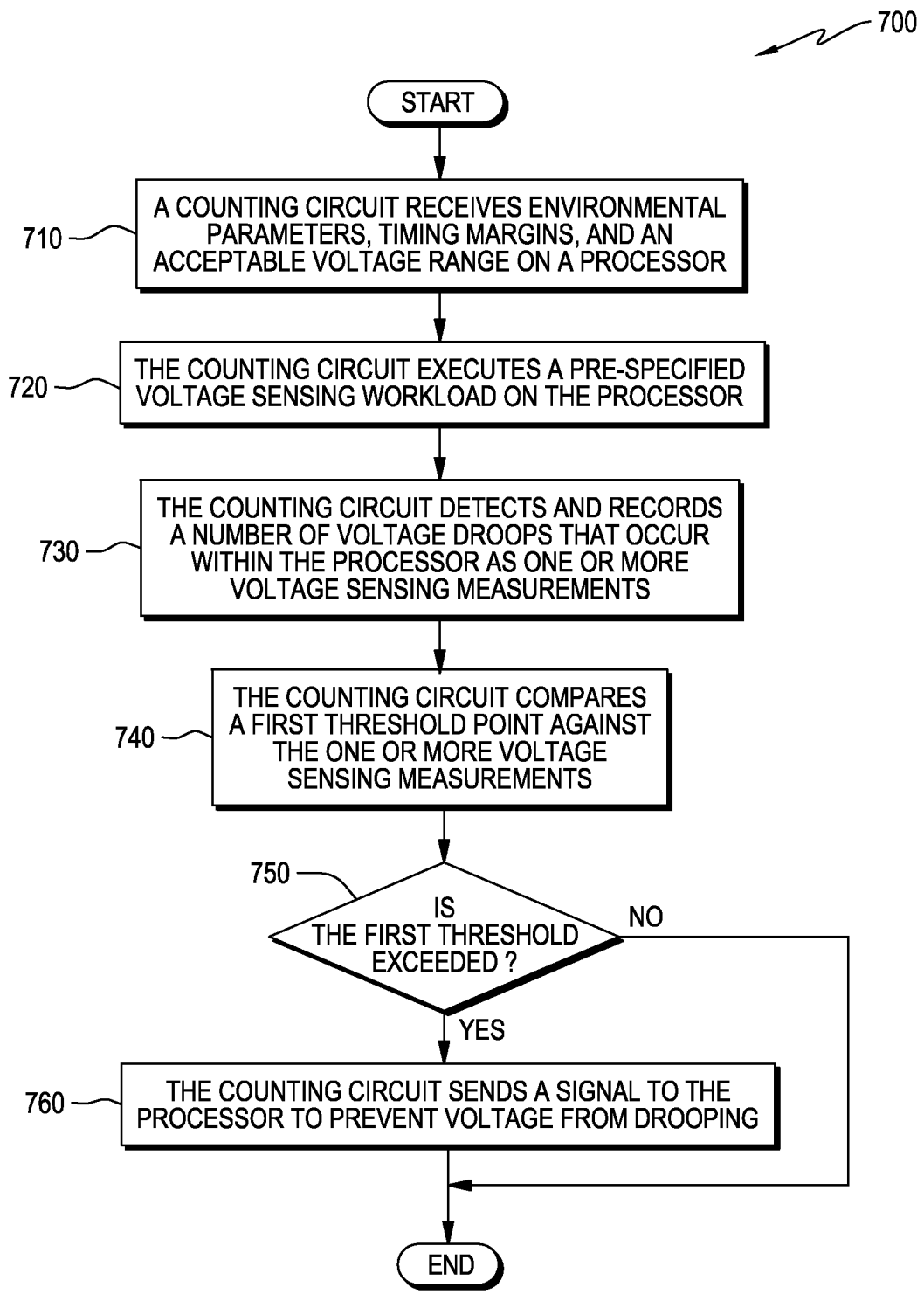
FIG. 7 is a flow diagram of a method for performing a power supply noise correction noise on a processor, according to an embodiment of the present invention.

Referring to FIG. 7, a flow diagram 700 for performing a noise correction function on processor 170 (shown in FIG. 1) in accordance with an embodiment of the present invention is depicted.

At step 710, a counting circuit receives environmental parameters, timing margins, and an acceptable voltage range for critical paths of processor 170. In particular, environmental parameters can include, but are not limited to: temperature, voltage gradient, etc. present on processor 170. In addition, the counting circuit can be counting circuit 600 (shown in FIG. 6). At step 720, the counting circuit executes a pre-specified voltage sensing workload on processor 170, wherein varied voltage and frequency settings are maintained on processor 170.

Further, at step 730, the counting circuit detects and records a number of voltage droops that occur within processor 170 one or more voltage sensing measurements. At step 740, the counting circuit compares a first threshold point determined by monitoring circuit in FIGS. 3A-3C against the one or more voltage sensing measurements. In addition, the first threshold point can be determined by any functional circuits or system architectures that is capable of detecting deleterious effect of power supply noise on processor 170 in accordance with embodiments of the present invention. In addition, the counting circuit comprises a comparator that operates to compare the first threshold against the one or more voltage sensing measurements.

At decision 750, if the one or more voltage sensing measurements exceeds the first threshold, at step 760, the counting circuit is adapted to send a signal to processor 170 so as to prevent voltage on processor 170 from dropping. Further, the counting circuit operates to clear drooping voltage on processor 170 once a pre-determined limit of dropping voltage is reached.

However, if the one or more voltage sensing measurements does not exceed the first threshold, method 700 end.

Embodiments of the present invention provide circuits or subassemblies of circuits as well as methods of operation, adapted to perform power supply noise mitigation functions on a processor 170. In one aspect, embodiments of the present invention can take the form of an entirely hardware embodiment, an entirely software embodiment, or an embodiment including both hardware and software aspects that can generally be referred to herein as a "circuit" or "system". In one embodiment, the present invention is implemented in hardware. The software can include but it is not limited to firmware, resident software, microcode, etc.

In particular, those skilled in the arts can recognize that functions of circuits or subassemblies of circuits described in accordance with embodiments of the present invention can be accomplished via other means. In addition, the foregoing description of various aspects of the present invention has been presented for purposes of illustration and description. It is not intended to be exhaustive or to limit the invention to the precise form disclosed and many modifications and variations are possible.

What is claimed is:

1. An apparatus for mitigating power supply noise in a processor, the apparatus comprising:

a central computing unit for executing program operations, wherein the central computing unit is operatively coupled to the processor;

a calibration circuit adapted to determine a first threshold on the processor to be used for comparison performed dynamically through the use of a detection circuit, wherein the calibration circuit includes a monitoring circuit, and wherein the monitoring circuit comprises an edge detection circuit adapted to detect and record during a pre-determined time period one or more voltage droops that occur within the processor as the first threshold, and wherein determination of the first threshold comprises:

the calibration circuit executing a pre-specified workload on the processor, wherein the pre-specified workload drives the same power supply load to each core of the processor; and the calibration circuit determining a range of jitter that occurs on the processor by detecting and recording during the pre-determined time period one or more voltage droops that occur within the processor at the first threshold;

a detection circuit adapted to dynamically monitor system operation of the processor and indicate if the first threshold is violated, wherein the detection circuit is adapted to compare the first threshold against one or more operational margins monitored on the processor, and if the one or more operational margins violates the first threshold, the detection circuit is further adapted to perform an instruction interrupt which places the processor into a degraded performance mode; and a counting circuit adapted to prevent voltage from drooping if one or more voltage sensing measurements violates the first threshold, wherein the counting circuit comprises a comparator, and wherein the comparator is adapted to compare the first threshold against the one or more voltage sensing measurements, wherein the counting circuit is adapted to compare the first threshold against one or more voltage sensing measurements, and wherein determination of the one or more voltage sensing measurements comprises:

the counting circuit receiving environmental parameters, timing margins, and an acceptable voltage range for critical paths of the processor;

the counting circuit executing a pre-specified voltage sensing workload on the processor for a sensing period of time, wherein varied voltage and frequency settings are maintained on the processor;

the counting circuit determining and recording, during system operation of the processor, a number of one or more voltage droops that occur within the processor as one or more voltage sensing measurements;

the counting circuit comparing the first threshold against the one or more voltage sensing measurements; and the counting circuit sending a signal to the processor so as to prevent voltage on critical paths from drooping if the one or more voltage sensing measurements exceeds the first threshold and, wherein if the first threshold is violated, a detection circuit is further adapted to adjust an operational parameter of the processor to avoid system failure or degradation of performance of the processor, and wherein adjustment of an operational parameter of the processor comprises:

the detection circuit adjusting operational parameters of multiple operating modes on the processor; and the detection circuit adjusting voltages, changing clock frequencies of throttling instruction rates on the processor.

2. The apparatus according to claim 1, wherein the first threshold is determined using a correctly functioning power supply to detect inadequate power delivered to the processor.

3. The apparatus according to claim 1, wherein the calibration circuit is adapted to determine multiple thresholds to support multiple corresponding operating clock frequencies during system operation of the processor.

4. The apparatus according to claim 1, wherein the detection circuit includes a droop threshold detect circuit adapted to dynamically monitor one or more operational margins during system operation of the processor, and wherein the droop threshold detect circuit is further adapted to determine if one or more operational margins violates the first threshold.

5. The apparatus according to claim 1, wherein the counting circuit is adapted to clear drooping voltage on the processor once a pre-determined limit of drooping voltage is reached.

* * * * *